United States Patent [19]

McDonald

[11] 4,322,939
[45] Apr. 6, 1982

[54] DEVICE FOR GATHERING FRUIT

[76] Inventor: Charles J. McDonald, Rte. 6, Box 136, Plant City, Fla. 33566

[21] Appl. No.: 152,980

[22] Filed: May 23, 1980

[51] Int. Cl.³ ............................................. A01D 51/00
[52] U.S. Cl. .................................. 56/328 R; 56/332; 294/19 A
[58] Field of Search ............................ 56/328 R, 332; 294/19 R, 19 A

[56] References Cited

U.S. PATENT DOCUMENTS

| | | | |
|---|---|---|---|
| 1,431,968 | 10/1922 | McDermott | 294/19 A |
| 2,058,709 | 10/1936 | Molinare | 294/19 A |
| 2,749,697 | 6/1956 | Poche | 56/328 R |
| 2,864,228 | 12/1958 | Griffith, Jr. | 56/328 R |
| 3,115,740 | 12/1963 | Hartley et al. | 56/328 R |

*Primary Examiner*—Paul J. Hirsch
*Attorney, Agent, or Firm*—Edwin E. Greigg

[57] ABSTRACT

A gatherer device for fruits, nuts, etc., which is made of wire shaped to form a basket which includes tines that are shaped to guide the fruit into the basket as the device is pushed along the ground in the direction of the fruit. The wires are connected together side-by-side on their upper length and the wires are shaped and spaced such that the fruit does not fall from the basket as the fruit is gathered.

5 Claims, 4 Drawing Figures

U.S. Patent  Apr. 6, 1982  4,322,939
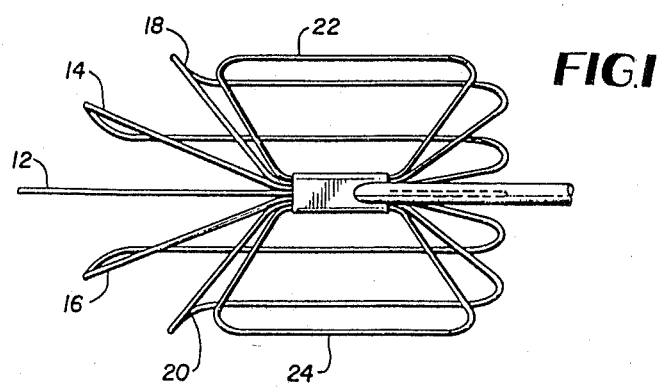
FIG.1
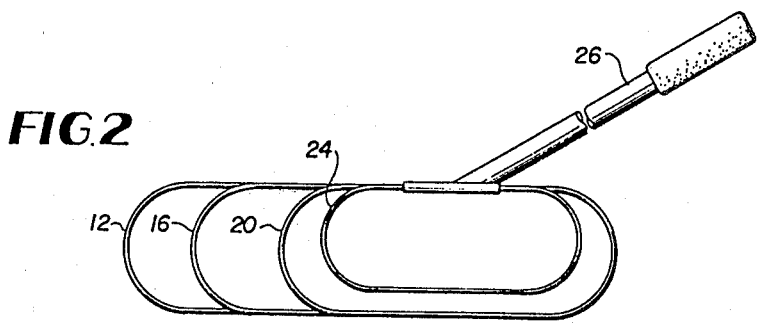
FIG.2
FIG.3
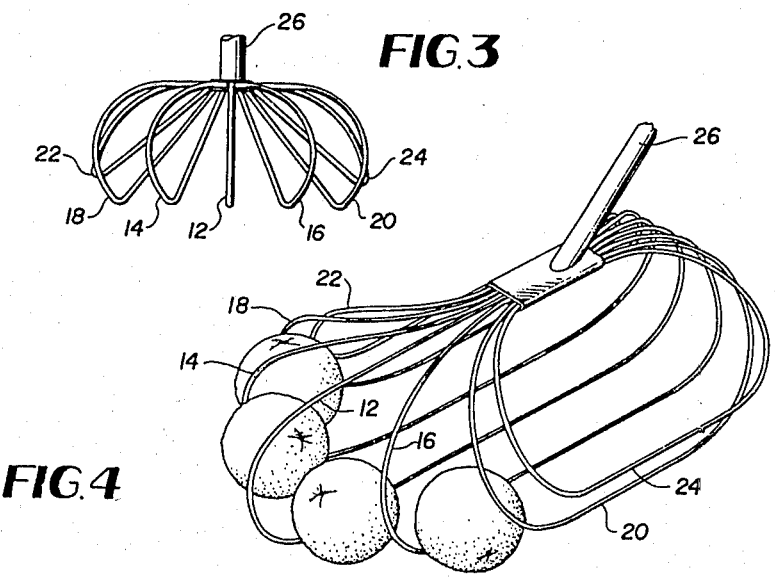
FIG.4

DEVICE FOR GATHERING FRUIT

BACKGROUND OF THE INVENTION

This invention relates to a manually operated hand-held device for gathering fruit such as oranges, nuts, grapefruit, tangerines, etc., which are lying on the ground.

Heretofore devices have been used for gathering fruit such as for the present device. These devices are useful for their purpose yet they have drawbacks which the present invention overcomes. U.S. Pat. No. 3,115,740 is directed to a device having parallel assembled tines to which other tines are secured. The tines are spaced such that the fruit, nuts, etc. may be guided into the device by the tine arrangement. The tines are curved in the vertical plane so that they are not flat on the ground surface.

U.S. Pat. No 2,864,228 is directed to a nut or fruit gatherer which has spaced tines rigidly held together and provided with spaced slots which are secured to the tines. The slots hold the fruit in the basket formed by the shape of the tines. The tines are rigidly held together such that there is very little give between the tines as the fruit passes between the tines.

OBJECT AND SUMMARY OF THE INVENTION

The device of this invention makes use of round steel wire tines or other type which are secured together along their upper portion and so assembled that each wire is separated from each other and are so shaped that the fruit will pass between the tines four at a time and be retained within the basket so formed by the tines. The tines have the flexibility that the fruit can be picked up without damage to the fruit and easily dumped from the basket once the basket is filled with fruit.

The invention will be better understood, and further objects and advantages thereof will become more apparent from the ensuing detailed description of a preferred embodiment taken in conjunction with the drawings.

BRIEF DESCRIPTION OF THE DRAWINGS

FIG. 1 is a top view of the device;
FIG. 2 is a side view;
FIG. 3 is an end view; and
FIG. 4 is a perspective view which illustrates fruit being picked up between the tines.

DETAILED DESCRIPTION

The device is made with seven separate wire tines each formed by a single wire with the ends welded or brazed together and secured together side-by-side along the top portion of the device. The wire tines are so shaped that they form a basket which stores the fruit as the fruit is picked up through the front of the device. Once the basket is full of fruit the device may be lifted with the front angled upwardly so that the fruit does not roll out of the basket and is then dumped into a container such as a box, basket, or truck-bed.

As shown, the tines are made of wire such as 3/16" steel type. The middlemost tine 12 is formed from a single piece of wire shaped to include upper and lower longitudinal straight portions with rounded front and rear end portions. The tine 12 is secured in a vertical plane. Tines 14 and 16 are secured along their upper longitudinal portion alongside tine 12. Tines 14 and 16 do not project as far out frontwardly as does tine 12 and are secured along their upper longitudinal portion such that their lower longitudinal portion is spaced from tine 12, each having the same spacing. The front end of tines 14 and 16 are bent away from the front end of tine 12 on a horizontal angle such that their front ends are curved and sloped on an angle relative to the vertical. The curvature and angular slope of tines 14 and 16 are such that the spacing of the upper curved portion of the curved front ends are spaced further from the curved end of tine 12 than the lower portion of tines 14 and 16 are from the lower portion of tine 12. Tines 18 and 20 are secured along their upper longitudinal portion outwardly of tines 14 and 16 and on the same plane such that the bottom longitudinal portions thereof are spaced from the longitudinal portions of tines 14 and 16. The rearward curved ends of tines 18 and 20 are substantially on a line with the curved ends of tines 12, 14 and 16. The front end of tines 18 and 20 are bent at a greater outward angle with respect to the longitudinal axis of tine 12 than the horizontal angle of tines 14 and 16. The curved ends of tines 18 and 20 are such that the upper portions of the curved ends are at a vertical angle with respect to the lower edge. Tines 22 and 24 are secured along their upper portion to tines 18 and 20, respectively, with their upper portion outside of tines 18 and 20 and on the same plane. The bottom longitudinal portion of tines 22 and and 24 do not extend downwardly to the same horizontal plane as tines 12, 14, 16, 18, 20 and 22 so that the lower longitudinal portion of tines 24 and 26 are on a plane above the other tines. The rearward and forward curved ends of tines 24 and 26 do not extend as far rearward or forward as that of tines 20 and 22 alongside which they are secured. The front curved ends of tines 24 and 26 are curved outwardly such that they are substantially on the same longitudinal plane as the curved front ends of tines 20 and 22.

The tines are secured together such that the upper portions of the tines are parallel with each other and secured to each other side-by-side. The tines form a basket in which the gathered fruit is carried until the basket is full. The spacing of the tines on the rear and on the bottom are such that the fruit to be gathered will not fall through the spacing. The front ends of the tines are spaced and angled such that the wire ends serve as guides to guide the fruit into the basket formed. The spacing of the front ends of each tine must be such that the fruit will easily pass through the spacing between the front curved ends of the basket formed. FIG. 4 shows a device being used to pick up four oranges at the same time. Since the device is formed of only spaced wire, any dirt, grass, rocks, etc. of small size will pass through the spacing between the wires while the fruit remains in the basket.

A handle 28 is welded or brazed to the device along the length at which the wires are secured together. For additional support, a flat piece of metal could be secured to the wires where the wires are secured together and the handle in turn secured to the flat plate.

For gathering oranges, the tines 14 and 16 may be spaced 2¼ inches from the tine 12 along their length and tines 18 and 20 are 2¼ inches from tines 14 and 16, respectively. Tines 22 and 24 are spaced one inch from tines 18 and 20, respectively, and are one inch above the plane of the bottom portions of the other tines. The tines could be on a horizontal angle from the back to the front with respect to the horizontal axis or with respect to tine 12 such that the back ends of the wires are closer together than the front ends of the wires. As seen in FIG. 2, all of the tines do not extend the same distance toward the front longitudinally. The particular shapes of the tines and their spacing provides a fruit gatherer which can be easily used, it is lightweight and the fruit and be quickly gathered. By raising the bottom portion of the outermost tines, these tines prevent the fruit from falling from the sides of the basket.

It will be obvious to those skilled in the art that the spacing of the tines, especially in the front, must be such that the fruit will easily pass between the tines and yet be retained within the basket so formed by the tines. By so changing the dimensions of the spacing, grapefruit, tangerines, nuts, etc., may be gathered.

In operation of the device, the bottom longitudinal portions of tines 12, 14, 16, 18 and 20 are placed on the ground surface and pushed forward toward the fruit to be gathered. The fruit lying on the ground in front of the device will pass between the tines and be retained within the basket formed by the wire which forms the tines. As shown in FIG. 4, four oranges can be gathered simultaneously. Once the basket is full, about 15 oranges, the front end is raised slightly to prevent the fruit from rolling out of the basket. The oranges can then be easily placed directly into a box, basket, crate or bed of a truck by lifting the device to the place of interest and allowing the oranges to roll from the basket.

The foregoing relates to a preferred exemplary embodiment of the invention, it being understood that other emmbodiments and variants thereof are possible within the spirit and scope of the invention, the latter being defined by the appended claims.

What is claimed and desired to be secured by Letters Patent of the United States is:

1. A gatherer device which comprises:
   a plurality of separate tines each having an upper longitudinal portion and a lower longitudinal portion with curved rear end portions and curved front end portions,
   each of said tines secured along their upper longitudinal portion in side-by-side relationship in the same plane,
   one of said tines secured with its upper and lower longitudinal portions in the same vertical plane,
   a first pair of separate tines secured on opposite sides of said vertically secured tine with their lower longitudinal portions equally spaced from said vertically disposed tine and in the same horizontal plane with said lower longitudinal portion of said vertically extending tine,
   a second pair of separate tines secured outwardly of said first pair of tines with their lower longitudinal portions equally spaced from the lower longitudinal portions of each tine of said first pair of tines and in the same horizontal plane,
   a third pair of separate tines secured outwardly of said second pair of tines with their lower longitudinal portion raised above the horizontal plane including the lower longitudinal portions of said first and second pairs of tines with the lower longitudinal portion of each tine of said third pair of separate tines on a vertical plane spaced from the lower longitudinal portions of each tine of said second pair of tines,
   whereby the spacing between the front curved ends of said tines is sufficient to easily pass fruit to be gathered and the spacing between the lower longitudinal portions of each of said tines and the spacing between the curved rear portions of said tines is of a spacing through which gathered fruit will not pass.

2. A gatherer device as claimed in claim 1, in which:
   the front curved end of each tine of said first and second pair of tines are curved at a horizontal angle away from said vertically disposed tine and the upper portion of said curved end of each of said tines of said first and second pairs of tines are at a vertical angle with respect to the lower portion of said curved ends,
   whereby the horizontal angle of the tines of said second pair of tines is greater than the horizontal angle of each of said tines of said first pair of tines.

3. A gatherer device as claimed in claim 1, in which: said device includes an upwardly extending handle secured to said upper longitudinal portions of said tines which are secured side-by-side to each other.

4. A gatherer device as claimed in claim 2, in which: said device includes an upwardly extending handle secured to said upper longitudinal portions of said tines which are secured side-by-side to each other.

5. A gatherer device as claimed in claim 2, in which: said tines of each pair of tines are of a different length than the tines of the other of said pairs of tines, and each pair of tines are of a different length from that of said vertically disposed tine.

* * * * *